United States Patent
Singh et al.

(10) Patent No.: US 9,656,205 B2
(45) Date of Patent: May 23, 2017

(54) SYSTEM AND METHOD FOR TREATMENT OF A MEDIUM

(71) Applicant: General Electric Company, Schenectady, NY (US)

(72) Inventors: Surinder Prabhjot Singh, Schenectady, NY (US); Harish Radhakrishna Acharya, Clifton Park, NY (US); Robert James Perry, Niskayuna, NY (US); John Brian McDermott, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 475 days.

(21) Appl. No.: 13/931,421

(22) Filed: Jun. 28, 2013

(65) Prior Publication Data

US 2015/0004082 A1    Jan. 1, 2015

(51) Int. Cl.
  *B01D 53/62* (2006.01)
  *B01D 53/14* (2006.01)
  (Continued)

(52) U.S. Cl.
  CPC ......... *B01D 53/62* (2013.01); *B01D 53/1406* (2013.01); *B01D 53/1475* (2013.01);
  (Continued)

(58) Field of Classification Search
  None
  See application file for complete search history.

(56) References Cited

U.S. PATENT DOCUMENTS 3,787,559 A  *  1/1974  Rudolph ............... B01D 53/52
                                                    423/222
4,102,982 A     7/1978  Weir, Jr.
                (Continued)

FOREIGN PATENT DOCUMENTS

GB       201014841    * 10/2010
SE       9504030 L      4/1996

OTHER PUBLICATIONS

Wood et al., "CO2-Capture Process using Aminosilicone-based Absorbents", American institute of Chemical Engineers—10th Conference Proceedings, 2010, 19 Pages.
(Continued)

*Primary Examiner* — Melvin C Mayes
*Assistant Examiner* — Sheng H Davis
(74) *Attorney, Agent, or Firm* — Pabitra K. Chakrabarti

(57) ABSTRACT

A system and method for treatment of a medium is disclosed. The system includes a plurality of separator zones and a plurality of heat transfer zones. Each of the separator zone and the heat transfer zone among the plurality of separator zones and heat transfer zones respectively, are disposed alternatively in a flow duct. Further, each separator zone includes an injector device for injecting a sorbent into the corresponding separator zone. Within the corresponding separator zone, the injected sorbent is reacted with a gaseous medium flowing in the flow duct, so as to generate a reacted gaseous medium and a reacted sorbent. Further, each heat transfer zone exchanges heat between the reacted gaseous medium fed from the corresponding separator zone and a heat transfer medium.

22 Claims, 6 Drawing Sheets

(51) Int. Cl.
  *B01D 53/34* (2006.01)
  *B01D 53/78* (2006.01)
  *B01D 53/83* (2006.01)

(52) U.S. Cl.
  CPC ............ *B01D 53/343* (2013.01); *B01D 53/78* (2013.01); *B01D 53/83* (2013.01); *B01D 2252/2041* (2013.01); *B01D 2252/20421* (2013.01); *B01D 2252/20484* (2013.01); *B01D 2252/20489* (2013.01); *B01D 2257/504* (2013.01); *B01D 2258/0283* (2013.01); *B01D 2259/65* (2013.01); *Y02C 10/04* (2013.01); *Y02C 10/06* (2013.01)

(56) References Cited

U.S. PATENT DOCUMENTS

| | | | | |
|---|---|---|---|---|
| 4,643,244 | A * | 2/1987 | Bosworth | F28D 7/0058 165/158 |
| 5,480,619 | A * | 1/1996 | Johnson | B01D 53/002 422/168 |
| 5,510,087 | A * | 4/1996 | Johnson | B01D 51/10 261/108 |
| 6,447,583 | B1 * | 9/2002 | Thelen | B01D 53/06 95/113 |
| 6,610,263 | B2 * | 8/2003 | Pahlman | C22B 7/006 423/239.1 |
| 6,719,828 | B1 * | 4/2004 | Lovell | B01D 53/02 423/210 |
| 7,056,482 | B2 | 6/2006 | Hakka et al. | |
| 8,030,509 | B2 | 10/2011 | Perry et al. | |
| 8,034,166 | B2 | 10/2011 | Asprion et al. | |
| 8,479,489 | B2 * | 7/2013 | Taylor | F01K 23/10 60/39.52 |
| 2005/0138922 | A1 * | 6/2005 | Boncodin | B01D 53/92 60/310 |
| 2008/0014129 | A1 * | 1/2008 | Merritt | B01J 12/007 422/168 |
| 2009/0056538 | A1 * | 3/2009 | Srinivasachar | B01D 53/10 95/58 |
| 2010/0290965 | A1 * | 11/2010 | Pfeffer | B01D 53/56 423/238 |
| 2011/0100217 | A1 | 5/2011 | Soloveichik et al. | |
| 2011/0192191 | A1 | 8/2011 | Timminns et al. | |
| 2012/0308457 | A1 | 12/2012 | Yoon et al. | |

OTHER PUBLICATIONS

Enick et al., "Novel High Capacity Oligomers for Low Cost CO2 Capture", GE—Department of Energy DE-NT0005310, Dec. 2010, 213 Pages.

Perry et al., "CO2 Capture using Phase-Changing Sorbents", Energy & Fuels, vol. 26, Issue 4, Mar. 20, 2012, pp. 2528-2538.

Westendorf et al., "Process Development for Phase-changing Aminosilicone-based CO2-Capture Absorbents", American Institute of Chemical Engineers—12th Conference Proceedings, 2012, 19 Pages.

Unofficial translation of Norwegian Office Action and Search Report issued in connection with corresponding NO Application No. 20141177 on Mar. 31, 2015.

\* cited by examiner

SYSTEM AND METHOD FOR TREATMENT OF A MEDIUM

This invention was made with Government support under contract number DE-AR0000084 awarded by U.S. Department of Energy. The Government has certain rights in the invention.

BACKGROUND

The present invention relates generally to a treatment of a medium, and more particularly to a system and method for treatment of a gaseous medium and/or a sorbent.

The emission of carbon dioxide (herein also referred as "$CO_2$") to environment is considered to be a cause of greenhouse effect, which contributes to global warming. The greenhouse effect is controlled by reducing the emission of the $CO_2$ to the environment. Some known techniques have been deployed to reduce the emission of the $CO_2$ from an exhaust gaseous medium to the environment. Such known techniques include using adsorbents, molecular filters or membranes, and absorber systems for removal of $CO_2$ from the exhaust gaseous medium.

Currently, there are various types of absorber systems or treatment systems for removal of $CO_2$ from the exhaust gaseous medium. One such absorber system includes a "tray tower" or a "packed tower", which is configured to contact the exhaust gaseous medium with a sorbent for absorption of $CO_2$ from the gaseous medium. The gaseous medium is introduced through a bottom of the tray tower or the packed tower and flows upward, while the liquid sorbent flows downward in a counter-current direction to the gaseous medium within the tray tower or the packed tower. The tray tower or the packed tower is not suitable for the sorbent that undergoes a phase change or may become highly viscous during absorption of $CO_2$ from the gaseous medium, as it may lead to plugging of the towers during operation of such towers. Such a sorbent may be used in the tray tower or the packed tower, along with a diluent so as to reduce the phase change or viscosity of the sorbent. However, usage of such diluent may incur additional cost or may not be readily available. Further, the high viscosity and the phase change of the sorbent, limits the usage of the sorbent that may have commercial advantages in terms of low energy and capital cost.

Further, such a process of removing the $CO_2$ from the gaseous medium leads to an increase in temperature of the gaseous medium and the sorbent due to a chemical reaction of the gaseous medium with the sorbent. Also, the extent of $CO_2$ absorption into the sorbent generally decreases with the increase in temperature of the gaseous medium and the sorbent, and hence the absorption process may slow-down or stop due to temperature equilibrium within the packed tower or the tray tower. Further, the gaseous medium may undergo a pressure drop, as the gaseous medium moves upwards along the packed tower or the tray tower. The pressure drop in the tray tower or the packed tower may be addressed by increasing a column diameter of such towers. However, installation cost and material cost may increase due to changes required in the structure of the towers.

Thus, there is a need for an improved system and method for treating a gaseous medium and/or a sorbent.

BRIEF DESCRIPTION

In accordance with one exemplary embodiment, a system for treating a medium is disclosed. The system includes a plurality of separator zones and a plurality of heat transfer zones. Each separator zone among the plurality of separator zones and each heat transfer zone among the plurality of separator zones are disposed alternatively in a flow duct. Further, each separator zone includes an injector device for injecting a sorbent into the corresponding separator zone such that the injected sorbent reacts with a gaseous medium flowing through the corresponding separator zone and generates a reacted gaseous medium and a reacted sorbent. Further, each heat transfer zone exchanges heat between the reacted gaseous medium fed from the corresponding separator zone and a heat transfer medium.

In accordance with one embodiment, a method of treating a medium is disclosed. The method includes directing a flow of a gaseous medium into a flow duct having a plurality of separator zones and a plurality of heat transfer zones. The method further includes alternatively disposing each separator zone among the plurality of separator zones and each heat transfer zone among the plurality of heat transfer zones in the flow duct. Further, the method includes injecting a sorbent into the corresponding separator zone, for reacting the sorbent with the gaseous medium flowing through the corresponding separator zone so as to generate a reacted gaseous medium and a reacted sorbent. Further, the method includes feeding a heat transfer medium into the corresponding heat transfer zone, for exchanging heat between the heat transfer medium and the reacted gaseous medium fed from the corresponding separator zone.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Figure 1:
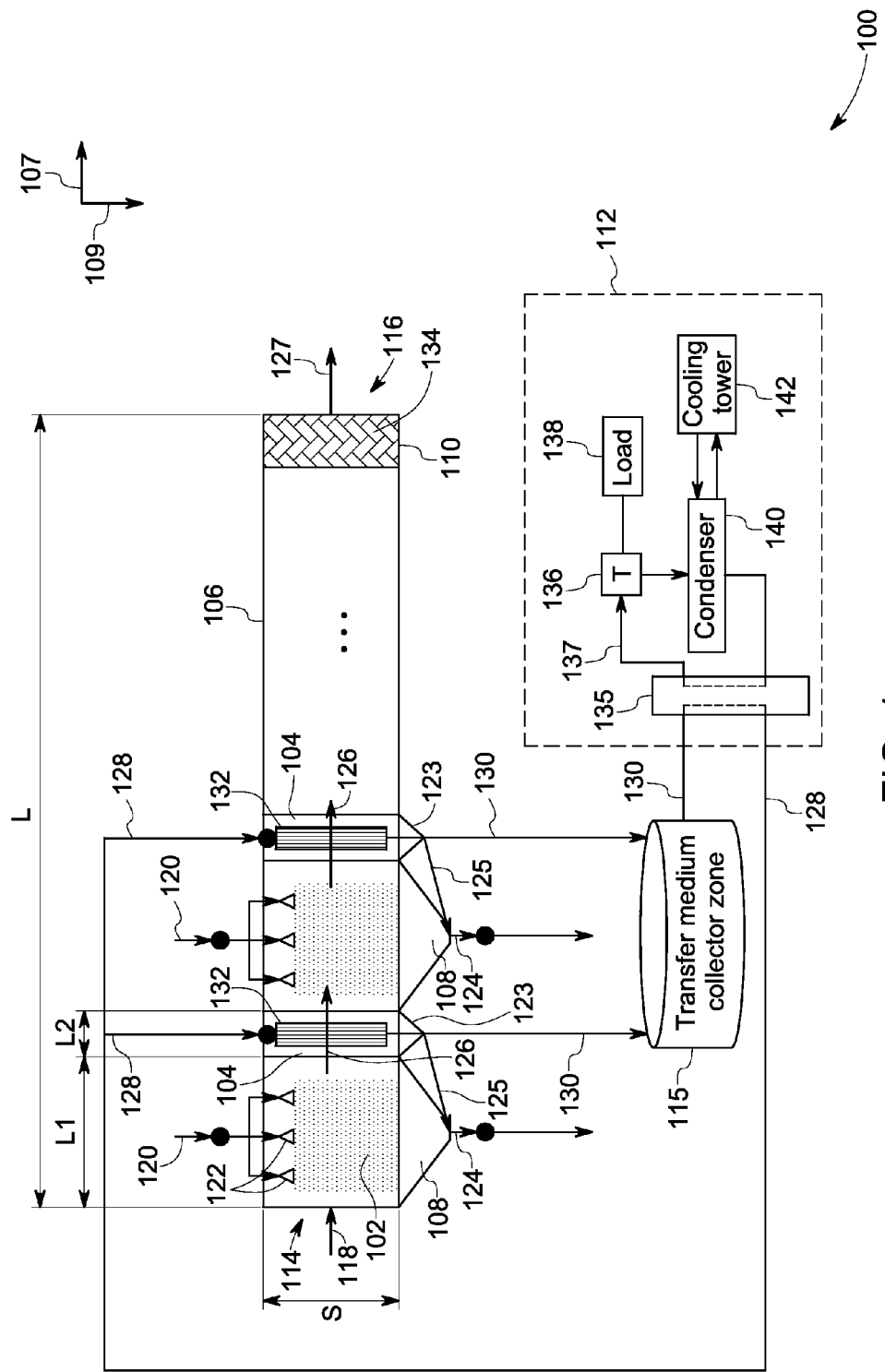
FIG. 1 is a schematic view of an exemplary treatment system in accordance with one exemplary embodiment.

While only certain features of embodiments of the invention have been illustrated and described herein, many modifications and changes will occur to those skilled in the art. It is, therefore, to be understood that the appended claims are intended to cover all such modifications and changes as fall within the true spirit of the invention.

Embodiments discussed herein disclose a system for treatment of a medium. More particularly, certain embodiments of the present invention disclose a system including a plurality of separator zones and a plurality of heat transfer zones. Each separator zone among the plurality of separator zones and each heat transfer zone among the plurality of heat transfer zones are disposed alternatively in a flow duct. The flow duct receives a gaseous medium from a gas source.

Further, each separator zone includes an injector device for injecting a sorbent into the corresponding separator zone. The injected sorbent is reacted with the gaseous medium flowing through the corresponding separator zone in the flow duct so as to generate a reacted gaseous medium and a reacted sorbent. Further, each heat transfer zone exchanges heat between the reacted gaseous medium fed from the corresponding separator zone and a heat transfer medium.

More specifically, certain embodiments of the present invention disclose an absorber system. More particularly, the absorber system of the present invention includes a plurality of separator zones and a plurality cooling zones. Each separator zone among the plurality of separator zones and each cooling zone among the plurality of cooling zones are disposed alternatively in a flow duct. The flow duct receives a gaseous medium from a gas source. Further, each separator zone includes an injector device for injecting a lean sorbent into the corresponding separator zone. The injected lean sorbent is reacted with the gaseous medium flowing through the corresponding separator zone in the flow duct so as to generate a reacted gaseous medium and a reacted rich sorbent. Further, each heat transfer zone cools the reacted gaseous medium fed from the corresponding separator zone, using a heat transfer medium. It should be noted herein the term "lean sorbent" may be referred to as a medium having a relatively lower percentage of absorbed gases within the medium. Similarly, the term "rich sorbent" may be referred to as a medium having a relatively higher percentage of absorbed gases within the medium.

More specifically, certain embodiments of the present invention disclose a desorber system. More particularly, the desorber system of the present invention includes a plurality of separator zones and a plurality heating zones. Each separator zone among the plurality of separator zones and each heating zone among the plurality of heating zones are disposed alternatively in a flow duct. The flow duct receives a gaseous medium from a gas source. Further, each separator zone includes an injector device for injecting a rich sorbent into the corresponding separator zone. The injected rich sorbent are reacted with the gaseous medium flowing through the corresponding separator zone in the flow duct so as to generate a reacted gaseous medium and a reacted lean sorbent. Further, each heat transfer zone heats the reacted gaseous medium fed from the corresponding separator zone, using a heat transfer medium.

FIG. 1 is a schematic view of an exemplary treatment system 100. In the exemplary embodiment, the treatment system 100 includes a plurality of separator zones 102, a plurality of heat transfer zones 104, a flow duct 106, a plurality of collector zones 108, a filter device 110. Further, the treatment system 100 includes an organic rankine cycle 112 disposed downstream of a transfer medium collector zone 115 coupled to the plurality of the heat transfer zones 104 via a heat transfer collector zone 123.

In the illustrated embodiment, each separator zone among the plurality of separator zones 102 and each heat transfer zone among the plurality of heat transfer zones 104 are disposed alternatively in the flow duct 106. It should be noted herein that each separator zone 102 includes a contactor section and separator section which are generally integrated. The contactor section may be used for contacting the mediums from different sources and the separator section is used for separating one medium from another medium. The illustrated embodiment does not depict the contactor section and the separator section explicitly. In the illustrated embodiment, the flow duct 106 is a horizontal duct disposed along a predefined direction 107. The flow duct 106 includes the plurality of separator zones 102 and the plurality of heat transfer zones 104 disposed along an overall length "L" of the flow duct 106. The overall length "L" of the flow duct 106 is designed based on length "L1" of each separator zone 102, length "L2" of each heat transfer zone 104, the number of separator zones 102 and the number of heat transfer zones 104 of the treatment system 100. Similarly, width "S" of the flow duct 106 is based on width of each separator zone 102 and each heat transfer zone 104. In the illustrated embodiment, two separator zones 102, two heat transfer zones 104 and one filter device 110 are depicted. A downstream end 116 of the flow duct 106 includes the filter device 110 for selectively allowing a reacted gaseous medium 126 to flow through the flow duct 106, while entrapping a reacted sorbent 130. The orientation of the flow duct 106 may vary based on the application and design criteria. In one embodiment, the flow duct 106 may be an exhaust transfer pipe line of a power plant. In such an embodiment, the flow duct 106 may discharge an exhaust flue stream or a gaseous medium 118 originating from a coal-fired power plant. In another embodiment, the gaseous medium 118 may originate from a gas source which may be used for collecting and storing the gaseous medium 118 from a gas originating source i.e. a power plant. The source for obtaining the gaseous medium 118 should not be construed as a limitation of the present invention.

In the illustrated embodiment, the separator zone 102 disposed at the upstream end 114 of the flow duct 106, receives the gaseous medium 118 from the gas source. In the illustrated embodiment, the gaseous medium 118 is fed along the predefined direction 107 into the corresponding separator zone 102 of the flow duct 106. The predefined direction of feeding the gaseous medium 118 into the corresponding separator zone 102 may vary based on the application and design criteria. In the illustrated embodiment, the separator zone 102 disposed at the upstream end 114 of the flow duct 106, receives a sorbent 120 from a sorbent source (not illustrated in FIG. 1). In the illustrated embodiment, the sorbent 120 is fed along a predefined direction 109 into the corresponding separator zone 102 of the flow duct 106. The predefined direction of feeding the sorbent 120 into the corresponding separator zone 102 may vary based on the application and design criteria. In the illustrated embodiment, specifically, the separator zone 102 receives the sorbent 120 perpendicular to the flow of the gaseous medium 118 in the corresponding separator zone 102 via a corresponding injector device 122. The flow of the gaseous medium 118 perpendicular to the flow of the sorbent 120 may also be referred to as a "cross-current flow". In some other embodiments, the gaseous medium 118 and the sorbent 120 may flow along a same predefined direction e.g. along the predefined direction 107. In such embodiments, the flow of the gaseous medium 118 parallel to the flow of the sorbent 120 may also referred to as a "co-current flow". In other embodiments, the flow of the mediums may vary based on the application and design criteria.

In one embodiment, the separator zone 102 disposed at the upstream end 114, receives the gaseous medium 118 at a flow rate of five meters per second. The flow rate of the gaseous medium 118 in each separator zone 102 may gradually reduce from the upstream end 114 to the downstream end 116 of the flow duct 106. The flow rate of the gaseous medium 118 may vary based on the application and design criteria. In one embodiment, each separator zone 102 receives the sorbent 120 at a flow rate of one meter per second. The flow rate mentioned above should not be construed as a limitation of the invention. The flow rate of the sorbent 120 may vary based on the application and design criteria.

As discussed previously, each separator zone 102 includes the injector device 122 for feeding the sorbent 120 perpendicular to the flow of the gaseous medium 118. The type of injector device 122 used in the treatment system 100 may vary based on the application and design criteria. In one embodiment, the sorbent 120 may be injected such that each droplet has a size of 500 μm diameter. The size of each droplet of the sorbent 120 may depend of a pore size of the injector device 122. The size of the droplet of the sorbent 120 may vary depending on the application and design criteria. It should be noted herein that other suitable methods and devices may also be adopted for controlling the size of the droplet. Further, the size of the droplet may influence the rate of reaction of the gaseous medium with the sorbent and may also influence the rate of settling of the sorbent and the separation of a portion of the component from the gaseous medium. The length "L1" of each separator zone 102 may be based on the size of the droplet.

In one embodiment, the gaseous medium 118 is a flue gas containing at least one of a carbon dioxide ("$CO_2$"), oxygen, carbon monoxide, nitrogen oxides, hydrogen sulfide, and sulfur oxides. In some other embodiments, the composition of the gaseous medium 118 may vary depending on the gas source from which the gaseous medium is received. In one embodiment, the sorbent 120 is an amino silicone from a GAP-0 or a GAP-1 medium. It should be noted herein the term "GAP-0" may be defined as 1,3-bis (3-aminopropyl)-1,1,3,3-tetramethyldisiloxane". Similarly, the term "GAP-1" may be defined as "1,5-bis(3-aminopropyl)-1,1,3,3,5,5-hexamethyltrisiloxane" The absorbing medium from the GAP-0 or the GAP-1 medium may include hindered amines such as methyldiethanolamine ("MDEA"), 2-amino-2-methyl-1-propanol ("AMP"). The sorbent 120 having a high percentage of solutes e.g. $CO_2$ may be referred to as a rich sorbent and the sorbent 120 having a low percentage of solutes e.g. $CO_2$ may be referred to as a lean sorbent. In some other embodiments, the composition of the sorbent 120 may vary depending on the sorbent source from which the sorbent is received.

The injected sorbent 120 and the gaseous medium 118 in each separator zone 102 may react to generate the reacted gaseous medium 126 and the reacted sorbent 124. The reaction may be either a chemical reaction i.e. chemisorption or a physical reaction i.e. physisorption. The reaction of the sorbent 120 with the gaseous medium 118 results in either absorption of a portion of a component e.g. $CO_2$ from the gaseous medium 118 or desorption of a portion of a component e.g. $CO_2$ from the sorbent 120. Further, the reaction of the sorbent 120 with the gaseous medium 118 results in either increase or decrease in temperature of the reacted gaseous medium 126.

In the illustrated embodiment, each separator zone among the plurality of separator zones 102 are coupled to a corresponding collector zone among the plurality of collector zones 108. Each collector zone 108 is disposed at the downstream end of the corresponding separator zone 102 for receiving the reacted sorbent 124. The reacted sorbent 124 may be in a liquid form or may be in solid form. In one embodiment, each collector zone 108 may be coupled to a screw conveyor or a pump for discharging the reacted sorbent 124 from the corresponding collector zone 108. Specifically, if the reacted sorbent 124 is in the solid form, the screw conveyor may be used, and if the reacted sorbent 124 is in the liquid form, the pump may be used. The type of reacted sorbent 124 may be dependent on the type of sorbent 120 used for reacting with the gaseous medium 118. The discharged reacted sorbent 124 may be used further for generating the sorbate.

In the illustrated embodiment, each heat transfer zone among the plurality of heat transfer zones 104 receives the reacted gaseous medium 126 from the corresponding adjacent separator zone 102. The reacted gaseous medium 126 may be at a high temperature or a low temperature depending on the reaction between the gaseous medium 118 and the sorbent 120 in the corresponding separator zone 102. Each heat transfer zone 104 receives a heat transfer medium 128 from a source (not illustrated in FIG. 1). In the illustrated embodiment, the heat transfer medium 128 is feed along the predefined direction 109 into the corresponding heat transfer zone 104 of the flow duct 106. The predefined direction of feeding the heat transfer medium 128 into the corresponding heat transfer zone 102 may vary based on the application and design criteria. In the illustrated embodiment, specifically, the heat transfer zone 104 receives the heat transfer medium 128 perpendicular to the flow of the reacted gaseous medium 126 received from the corresponding adjacent separator zone 102.

In one embodiment, each heat transfer zone 104 enables exchange of heat between the reacted gaseous medium 126 and the heat transfer medium 128 by directly contacting the reacted gaseous medium 126 with the heat transfer medium 126. In some other embodiments, each heat transfer zone 104 enables exchange of heat between the reacted gaseous medium 126 and the heat transfer medium 128 indirectly. In one embodiment, the exchanging of heat includes heating the reacted gaseous medium 126 in the corresponding heat transfer zone 104. In some other embodiments, the exchanging of heat includes cooling the reacted gaseous medium 126 in the corresponding heat transfer zone 104. In one embodiment, the heat transfer medium 128 is steam and in another embodiment, the heat transfer medium 128 is a chilled fluid. The type of heat transfer medium 128 used for heating or cooling the reacted gaseous medium 126 may vary depending on the application and design criteria.

In the illustrated embodiment, the heat transfer medium 128 is supplied to the corresponding heat transfer zone 104 via a heat exchanger device 132. The heat exchanger device 132 may include a plurality of channels for circulating the heat transfer medium 128 so as to exchange the heat with the reacted gaseous medium 126 fed from the corresponding adjacent separator zone 102 and generate the heat transfer medium 130. In the illustrated embodiment, the reacted gaseous medium 126 is cooled and the heat transfer medium 128 is heated.

The downstream end of each heat transfer zone 104 is coupled to the heat transfer collector zone 123. The heat transfer collector zone 123 is used to separate the reacted sorbent 124 entrapped from the heat transfer medium 130. Each heat transfer collector zone 123 is coupled to the corresponding collector zone 108 via a transfer line 125 for re-circulating the entrapped reacted sorbent 124. Further, the downstream end of the each heat transfer zone 104 is coupled to an organic rankine cycle 112 via the transfer medium collector zone 115. The transfer medium collector zone 115 collects the heat transfer medium 130 from each of the heat transfer zone 104. The heat transfer medium 130 is then circulated in the organic rankine cycle 112 for power generation. In some embodiments, the power generation process is optional. The organic rankine cycle 112 typically includes an evaporator 135, a turbine 136, a load 138, a condenser 140, and a cooling tower 142. In the illustrated embodiment, the evaporator 135 is coupled to the transfer medium collector zone 115 for receiving the heat transfer medium 130 in heat exchanging relationship with a working fluid 137 so as to heat the working fluid 137 and thereby generate cooled heat transfer medium 128. The heat transfer medium 128 is later re-circulated into each heat transfer zone 104. In some embodiments, the heat from the transfer medium 130 may be transferred to a steam or organic solvent circulated in the organic rankine cycle 112, and the cooled heat transfer medium 128 may be further sub-cooled before re-circulating into each heat transfer zone 104. In such embodiments, the heated working fluid 137 is expanded in the turbine 136 so as to drive the load 138 i.e. generator coupled to the turbine 136. The turbine 136 is coupled to the condenser 140 for condensing the expanded working fluid fed from the turbine 136. The condenser 140 is coupled to the cooling tower 142 for receiving a cold stream so as to condense the expanded working fluid 137 in the condenser 140.

In some other embodiments, the reacted gaseous medium 126 is heated in the corresponding heat transfer zone 104, so as to generate the cooled heat transfer medium 130. In such embodiments, the cooled heat transfer medium 130 is circulated through the cooling tower 142 of the organic rankine cycle 112, in heat exchange relationship with the working fluid in the condenser 140.

In the illustrated embodiment, the downstream end 116 of the flow duct 106 includes the filter device 110. As discussed previously, the filter device 110 is used for blocking any remaining reacted sorbent 124 from exiting the last separator zone 102 along with the reacted gaseous medium 126. The reacted sorbent 124 may be filtered using a membrane 134 of the filter device 110, thereby allowing a remaining portion 127 of the reacted gaseous medium 126 to flow through. The entrapped reacted sorbent 124 is either collected in solid or liquid form in the collector zone 108.

In one embodiment, the length "L1" of each separator zone 102 may vary along the length of the flow duct 106. In other words, each separator zone 102 may have different length compared to the other separator zones 102. In some other embodiments, the length "L1" of each separator zone 102 may be constant along the length of the flow duct 106. In one embodiment, the length "L2" of each heat transfer zone 104 is constant along the length of the flow duct 106. The residence time of the gaseous medium 118 in the corresponding separator zone 102 is dependent on the length of the corresponding separator zone 102 along the predefined direction of flow of gaseous medium 118 i.e. along the predefined direction 107. The length "L1" of each separator zone among the plurality of separator zone 102 is designed based on at least one of a flow rate of the gaseous medium 118, a composition of the gaseous medium 118, a flow rate of the sorbent 120, a composition of the sorbent 120, size of each droplet of the sorbent 120 injected from the injector device 122, and a density difference between the sorbent 120 and the gaseous medium 118 in the corresponding separator zone 102.

Figure 2:
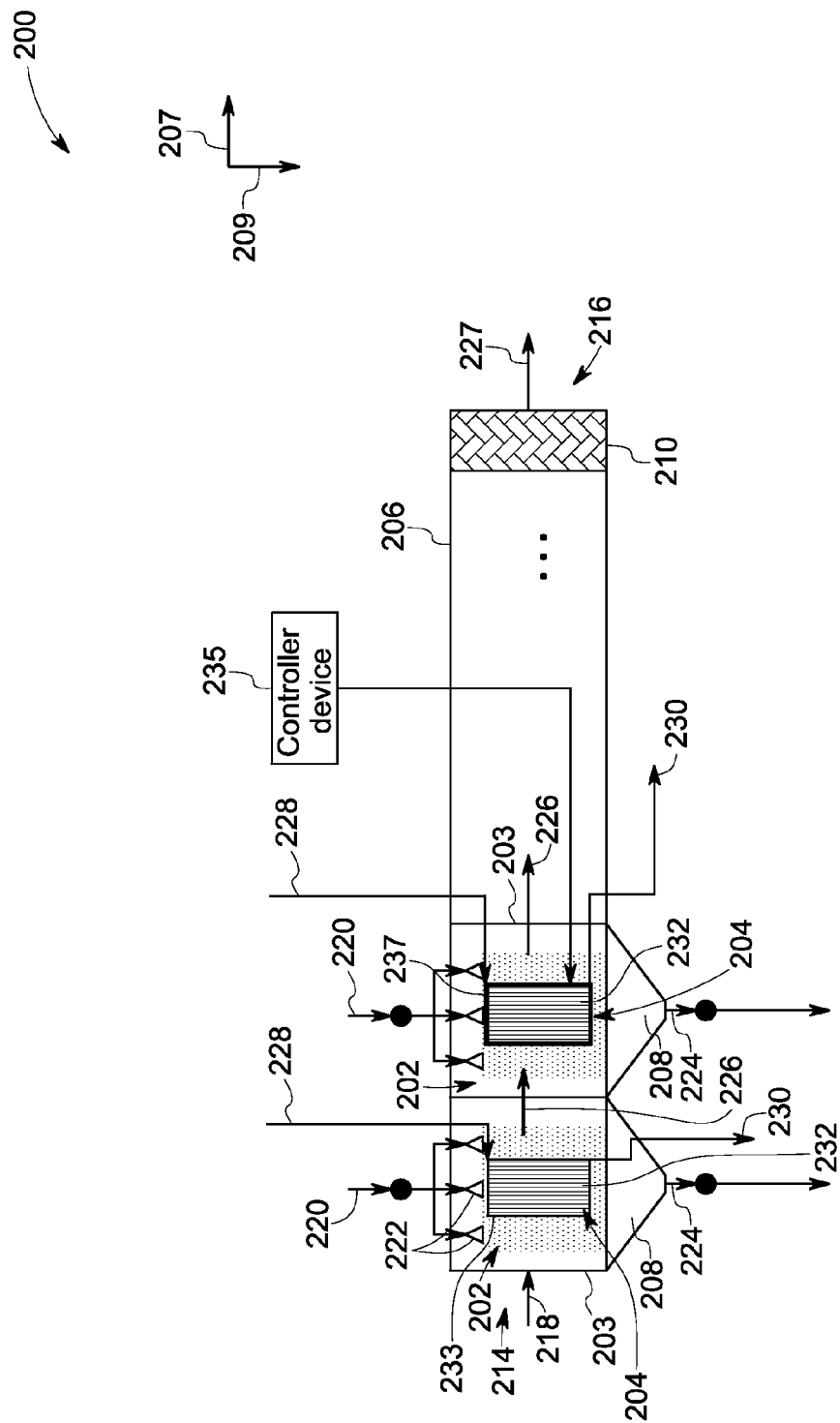
FIG. 2 is a schematic view of an exemplary treatment system in accordance with another exemplary embodiment.

FIG. 2 is a schematic view of an exemplary treatment system 200 in accordance with another embodiment. In the another embodiment, the treatment system 200 includes a plurality of separator zones 202, a plurality of heat transfer zones 204, a flow duct 206, a plurality of collector zones 208, and a filter device 210.

In the illustrated embodiment, each corresponding separator zone among the plurality of separator zones 202 and each corresponding heat transfer zone among the plurality of heat transfer zones 204 are integrated to form an integrated zone 203. In the illustrated embodiment, each heat transfer zone 204 is disposed within the corresponding separator zone 202. The separator zone 202 disposed at an upstream end 214 of the flow duct 206 receives a gaseous medium 218. The received gaseous medium 218 flow through the flow duct 206 via the corresponding separator zones 202 and heat transfer zones 204, till the gaseous medium 218 reaches a downstream end 216 of the flow duct 206. Each separator zone 202 includes an injector device 222 for injecting a sorbent 220. Similarly, each heat transfer zone 204 includes a heat exchanger 232 for circulating a heat transfer medium 228. The heat exchanger 232 includes a non-stick coating 233 for preventing fouling of the corresponding heat transfer zone 204. The corresponding heat transfer zone among the plurality of heat transfer zones 204 includes a vibrator device 237 to periodically vibrate the heat exchanger 232 and thereby prevent fouling of corresponding heat transfer zone 204. In the illustrated embodiment, the vibrator device 237 is actuated via a controller device 235. In one embodiment, the heat exchanger 232 in the alternative heat transfer zones 204 may include the vibrator device 237 and the non-stick coating 233. In another embodiment, the heat exchanger 232 in each heat transfer zone 204 may include the vibrator device 237 and the non-stick coating 233.

The separator zone 202 receives the gaseous medium 218 from a gas source (not illustrated in FIG. 2) along a predefined direction 207. Similarly, the corresponding separator zone 202 also receives the sorbent 120 via the corresponding injector device 222 from a sorbent source along the predefined direction 209. Further, the corresponding heat transfer zone 204 receives the heat transfer medium 228 from a heat transfer medium source (not illustrated in FIG. 2) along the a predefined direction 209 and circulates the received heat transfer medium 228 via the heat exchanger 232. It should be noted herein that in other embodiments, the predefined direction may vary without limiting the scope of the present invention.

The sorbent 220 is reacted with the gaseous medium 218 in the corresponding integrated zone 203. The reaction of the gaseous medium 218 with the sorbent 220 results in either absorbing a portion of a component from the gaseous medium 218 or desorbing a portion of a component from the sorbent 220 so as to generate a reacted gaseous medium 226 and a reacted sorbent 224 in the corresponding integrated zone 203. The absorption results in increase in temperature of the reacted gaseous medium 226 and desorption results in decrease in temperature of the reacted gaseous medium 226. The corresponding heat transfer zone 204 exchanges heat between the reacted gaseous medium 226 and the heat transfer medium 228 via the heat exchanger 232. The non-stick coating 233 prevents the sticking of the reacted sorbent 224 so as to avoid the fouling of corresponding heat transfer zone 204. The reacted gaseous medium 226 is transferred into the adjacent integrated zone 203 for further reaction with the sorbent 220. At the downstream end 216 of the flow duct 206, a remaining portion of a component in the reacted gaseous medium 226 is collected after entrapping any remaining reacted sorbent 224 via the filter device 210. At the downstream end of each integrated zone 203, a corresponding collector zone 208 is disposed for collecting the reacted sorbent 224. The reacted sorbent 224 from each collector zone 208 is either removed via a pump or a screw conveyor (not illustrated in FIG. 2) for further processing of the reacted sorbent 224.

Figure 3:
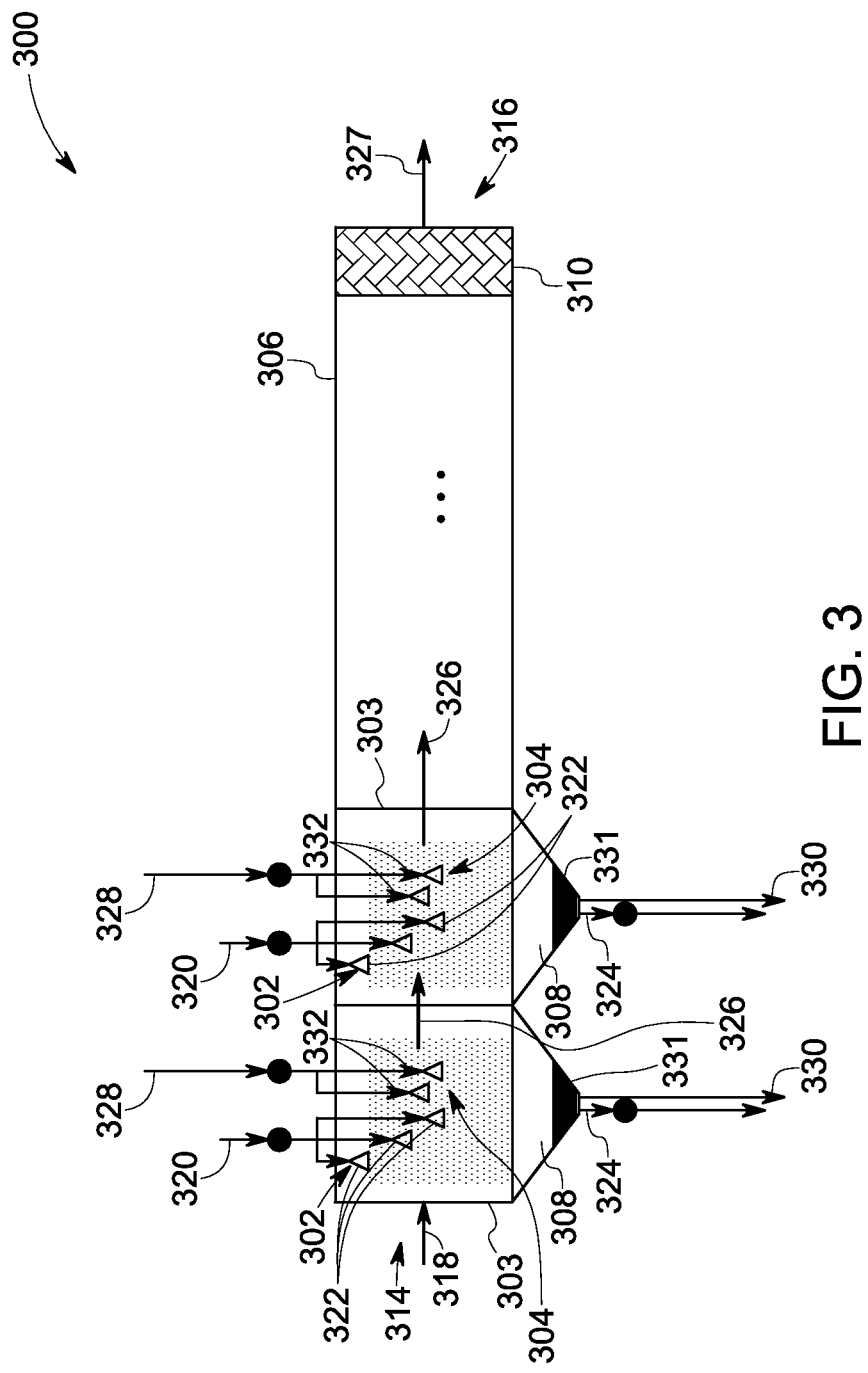
FIG. 3 is a schematic view of an exemplary treatment system in accordance with yet another exemplary embodiment.

FIG. 3 is a schematic view of an exemplary treatment system 300 in accordance with yet another embodiment. In the illustrated embodiment, the treatment system 300 includes a plurality of separator zones 302, a plurality of heat transfer zones 304, a flow duct 306, a plurality of collector zones 308, a filter device 310.

Each corresponding separator zone among the plurality of separator zones 302 and each corresponding heat transfer zone among the plurality of heat transfer zones 304 are integrated to form an integrated zone 303. In the illustrated embodiment, each heat transfer zone 304 is disposed within the corresponding separator zone 302. In one embodiment, the separator zone 302 disposed at an upstream end 314 of the flow duct 306 receives a gaseous medium 318. The received gaseous medium 318 flows through the flow duct 306 via the corresponding separator zones 302 and heat transfer zones 304, until the gaseous medium reaches a downstream end 316 of the flow duct 306. Each separator zone 302 includes an injector device 322 for injecting a sorbent 320. Each heat transfer zone 304 includes a sprayer device 332 for spraying a heat transfer medium 328 within the separator zone 302. The corresponding heat transfer zone 304 exchanges heat directly between a reacted gaseous medium 326 and a heat transfer medium 328 by injecting the heat transfer medium 328 to the reacted gaseous medium 326. In the collector zone 308, the reacted sorbent 324 is separated from the heat transfer medium 330 via a separation filter 331.

Figure 4:
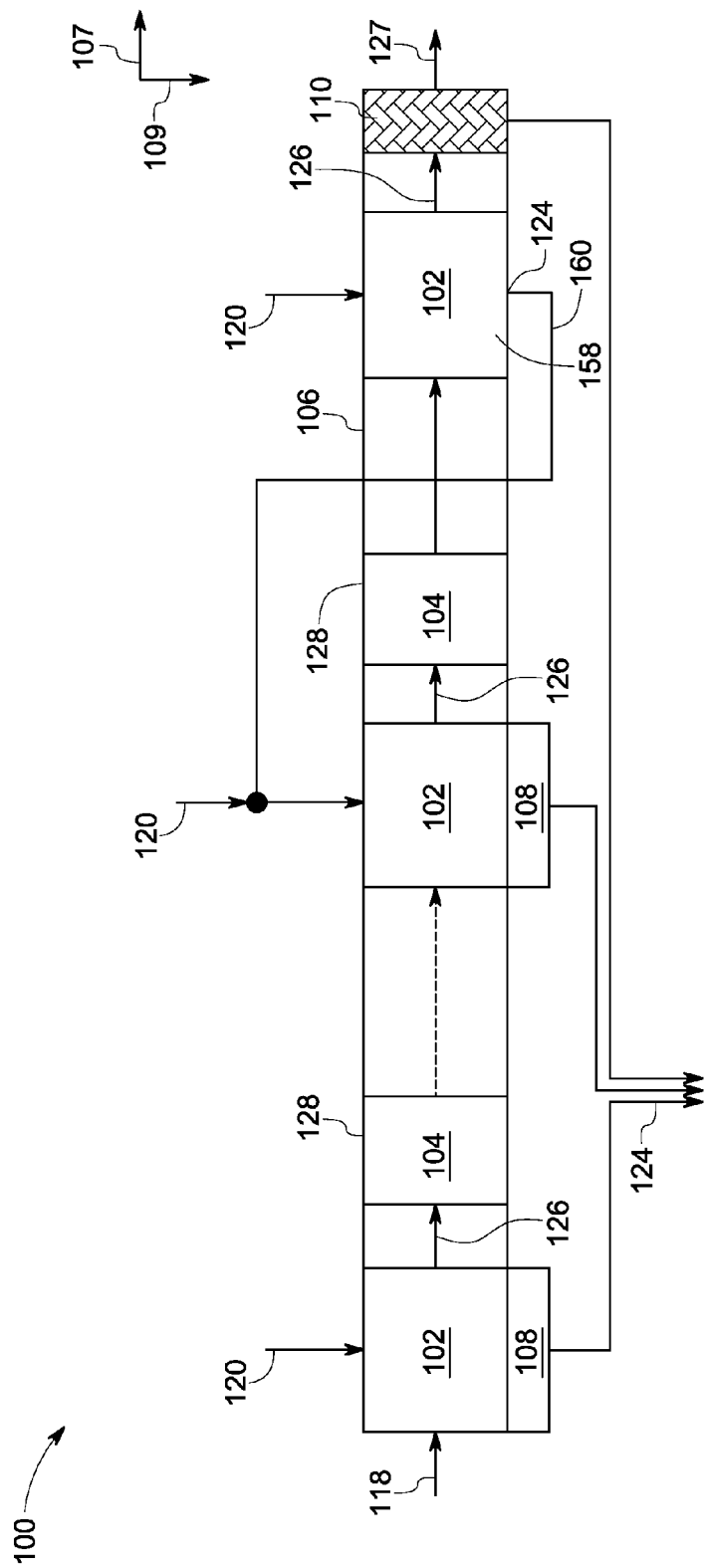
FIG. 4 represents a block diagram of treatment system having a recirculation line in accordance with one exemplary embodiment.

FIG. 4 represents a block diagram of the treatment system 100 having a recirculation channel 160 in accordance with the exemplary embodiment of FIG. 1. In the illustrated embodiment, one downstream separator zone 102 is coupled to the injector device 122 (as illustrated in FIG. 1) of one upstream separator zone 102 for recirculating the reacted sorbent 124 to the upstream separator zone 102 via the recirculation channel 160. The upstream separator zone 102 receives the sorbent 120 and the reacted sorbent 124 for reacting with either the gaseous medium 118 or the reacted gaseous medium 126. The reacted sorbent 124 is recirculated for optimally exhausting the capability of the reacted sorbent 124 to react with either the gaseous medium 118 or the reacted gaseous medium 126 to either absorb a portion of a component from the gaseous medium 118 or desorb a portion of a component from the reacted sorbent 124. The reacted sorbent 124 is recirculated in a stage wise countercurrent direction in the upstream separator zone 102, for optimally exhausting the capability of the reacted sorbent 124.

Figure 5:
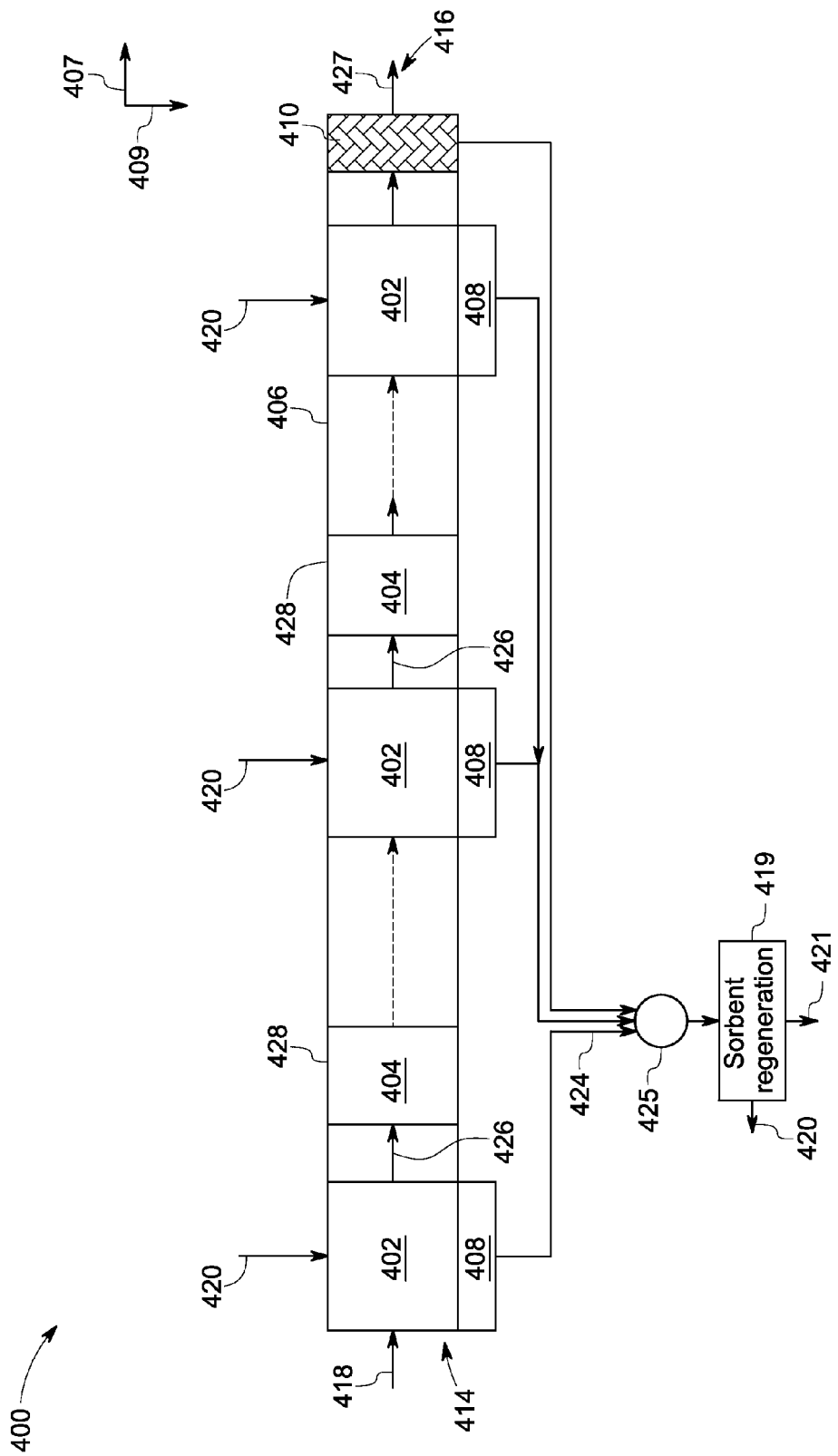
FIG. 5 represents a block diagram of an absorber system in accordance with one exemplary embodiment.

FIG. 5 represents a block diagram of a treatment system 400 in accordance with one exemplary embodiment. In the illustrated embodiment, the treatment system 400 is an absorber system. The treatment system 400 includes a plurality of separator zones 402, a plurality of heat transfer zones 404, a flow duct 406, a plurality of collector zones 408, and a filter device 410. Further, the absorber system 400 includes a sorbent regeneration zone 419. In the illustrated embodiment, the separator zone 402 is an absorber zone and the heat transfer zone 404 is a cooling zone. It should be noted herein in the illustrated embodiment, the terms "separator zone" and the "absorber zone" may be used interchangeably. Similarly, the terms "heat transfer zone" and the "cooling zone" are used interchangeably.

In one embodiment, each corresponding absorber zone among the plurality of absorber zones 402 and each corresponding cooling zone among the plurality of cooling zones 404 are disposed alternatively within the flow duct 406. The absorber zone 402 disposed at an upstream end 414 of the flow duct 406 receives a gaseous medium 418 along a predefined direction 407 and a sorbent 420 along a predefined direction 409. In the illustrated embodiment, the sorbent 420 may be a lean sorbent. The gaseous medium 418 includes $CO_2$ as a component of the gaseous medium 418. The gaseous medium 418 is reacted with the sorbent 420 so as to absorb a portion of the $CO_2$ from the gaseous medium 418. The reaction of the sorbent 420 with the gaseous medium 418 results in a formation of a reacted sorbent 424 and a reacted gaseous medium 426 which may contain some portion of the $CO_2$. The reacted sorbent may be a rich sorbent. In the illustrated embodiment, the reaction of the sorbent 420 with the gaseous medium 418 results in increase in temperature of the reacted gaseous medium 426 due to an exothermic reaction.

The reacted gaseous medium 426 is then transferred to the corresponding adjacent cooling zone 404. In the cooling zone 404, a heat transfer medium 428 is fed along the predefined direction 409. In the illustrated embodiment, the heat transfer medium 428 is a cooling fluid. In the illustrated embodiment, the terms "heat transfer medium" and the "cooling fluid" are used interchangeably. Heat is exchanged between the heat transfer medium 428 and the reacted gaseous medium 426 so as to reduce the temperature of the gaseous medium 426 and generate a heat transfer medium. The reacted gaseous medium 426 is transferred to the next absorber zone 402 for removing further portion of the component i.e. $CO_2$ from the reacted gaseous medium 426 by further reacting the reacted gaseous medium 426 with the sorbent 420. At the downstream end 416 of the flow duct 406, the filter device 410 is used remove the reacted sorbent 424 from getting discharged along with a remaining portion of component of the reacted gaseous medium 427.

The downstream end of each absorber zone 402 is coupled to the corresponding collector zone 408 for receiving the reacted sorbent 424 from the corresponding absorber zone 402. In the illustrated embodiment, the reacted sorbent 424 is removed from the plurality of collector zones 408 via a screw conveyor 425. Additionally, the reacted sorbent 424 (rich sorbent) is processed in the sorbent regeneration zone 419 so as to generate the lean sorbent 420 and a sorbate 421.

Figure 6:
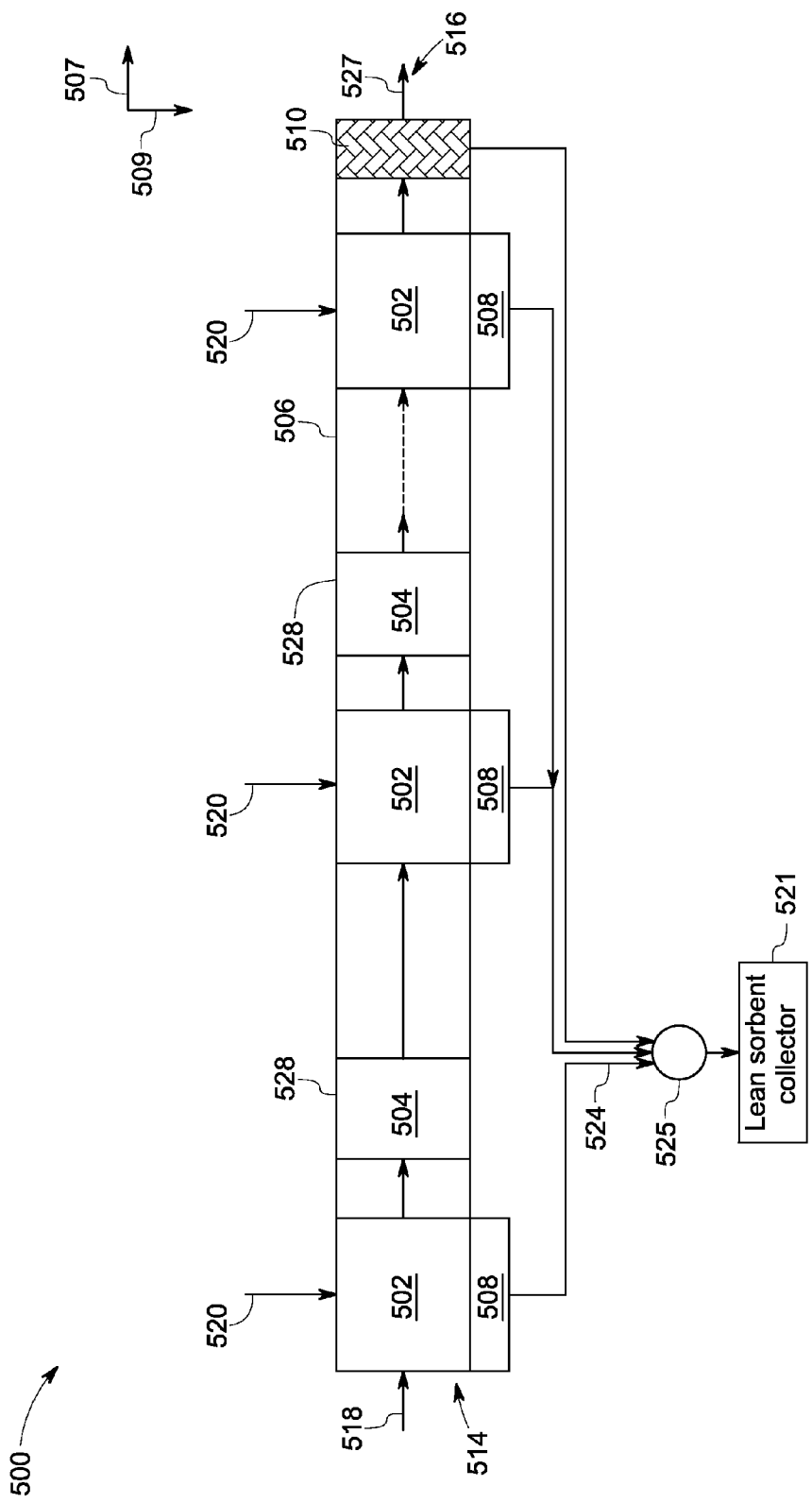
FIG. 6 represents a block diagram of a desorber system in accordance with one exemplary embodiment.

FIG. 6 represents a block diagram of a treatment system 500 in accordance with one exemplary embodiment. In the illustrated embodiment, the treatment system 500 is a desorber system. The treatment system 500 includes a plurality of separator zones 502, a plurality of heat transfer zones 504, a flow duct 506, a plurality of collector zones 508, and a filter device 510. In the illustrated embodiment, the separator zone 502 is a desorber zone and the heat transfer zone 504 is a heating zone. The terms "separator zone" and "desorber zone" may be used interchangeably. Similarly, the terms "heat transfer zone" and "heating zone" may be used interchangeably.

In one embodiment, each corresponding desorber zone among the plurality of desorber zones 502 and each corresponding heating zone among the plurality of heating zones 504 are disposed alternatively with in the flow duct 506. The desorber zone 502 disposed at an upstream end 514 of the flow duct 506 receives a gaseous medium 518 along a predefined direction 507 and a sorbent 520 along a predefined direction 509. In the illustrated embodiment, the sorbent 520 is a rich sorbent. In one example, the gaseous medium 518 may contains $CO_2$ or steam. The gaseous medium 518 is reacted with the sorbent 520 so as to desorb a portion of the $CO_2$ from the sorbent 520. The reaction of the sorbent 520 with the gaseous medium 518 results in formation of a reacted sorbent 524 (lean sorbent) and a reacted gaseous medium 526 having a portion of $CO_2$.

The reaction of the sorbent 520 with the gaseous medium 518 results in decrease in temperature of the reacted gaseous medium 526.

The reacted gaseous medium 526 is transferred to the corresponding heating zone 504. In the heating zone 504, a heat transfer medium 528 is fed along the predefined direction 509. In the illustrated embodiment, the heat transfer medium 528 is a heating medium. The heat transfer zone 504 feeds the heat transfer medium 528 perpendicular to the flow of the reacted gaseous medium 526. Heat is exchanged between the reacted gaseous medium and the heat transfer medium 528 so as to increase the temperature of the reacted gaseous medium 526 and generate a cooled heat transfer medium (not illustrated). The reacted gaseous medium 526 having a portion of $CO_2$ is then transferred to the next desorber zone 502 for further removing a portion of $CO_2$ from the rich sorbent 520. At the downstream end 516 of the flow duct 506, the filter device 510 is used to remove the lean sorbent 524 from getting discharged along with a rich reacted gaseous medium 527.

The downstream end of each desorber zone 502 is coupled to the corresponding collector zone 508 for receiving the lean sorbent 524 from the corresponding desorber zone 502. The lean sorbent 524 is removed from the plurality of collector zones 508 via a liquid pump 525. Further, the lean sorbent 524 is collected in a lean sorbent collector 521 for further utilization outside the system 500.

Embodiments of the present invention discussed herein facilitate to increase the efficiency of absorption of $CO_2$ from a flue gas via the sorbent and hence increases an amount of carbon that is captured for a given quantity of sorbent. Further, the waste heat that is recovered in the absorber may be utilized in the organic rankine cycle to produce additional electricity. Further, the embodiments discussed herein may be extended to a different type of gaseous medium application which may yield high-viscosity sorbent either in a liquid or a solid form. Also, the high-viscosity sorbent may have various commercial advantages over conventional solvents/sorbent in terms of low energy and capital costs. Further, the embodiments disclosed herein may effectively address the intermediate heating problem during absorption process of the gaseous medium and intermediate cooling problem during desorption process of the sorbent in the treatment system. Also, the embodiments disclosed herein may be used for large-scale commercial applications for removal of $CO_2$, sulfur dioxide ($SO_2$), nitrogen dioxide ($NO_2$), and other contaminants emitted from a power plant or a chemical plant or a refinery. The embodiments may handle high amounts of gas flow rates and also addresses the problems related to the pressure drops of the gaseous medium.

While certain features have been illustrated and described herein, many modifications and changes will occur by those skilled in the art. It is, therefore, to be understood that the appended claims are intended to cover all such modifications and changes as fall within the true spirit of the invention.

The invention claimed is:

1. A system comprising:
a plurality of separator zones;
a plurality of heat transfer zones, wherein each separator zone among the plurality of separator zones and each heat transfer zone among the plurality of heat transfer zones are disposed alternatively in a flow duct entirely oriented along a horizontal direction with reference to a flow of a gaseous medium, wherein each separator zone comprises an injector device for injecting a sorbent into the corresponding separator zone, for reacting the sorbent with the gaseous medium flowing through the corresponding separator zone so as to generate a reacted gaseous medium and a reacted sorbent, wherein each heat transfer zone exchanges heat between the reacted gaseous medium fed from the corresponding separator zone and a heat transfer medium;
a recirculation channel protruding outwardly from the flow duct and extending from one separator zone disposed downstream to another separator zone disposed upstream among the plurality of separator zones, for recirculating the reacted sorbent from the one separator zone to the other separator zone; and
a plurality of collector zones, wherein each collector zone among the plurality of collector zones is coupled to a downstream side of the corresponding separator zone, for receiving the reacted sorbent from the corresponding separator zone.

2. The system of claim 1, wherein each separator zone among the plurality of separator zones, comprises an absorber zone.

3. The system of claim 2, wherein the corresponding injector device injects the sorbent perpendicular to the flow of the gaseous medium in the corresponding absorber zone, for absorbing a portion of a component from the gaseous medium so as to generate the reacted gaseous medium and the reacted sorbent.

4. The system of claim 3, wherein each heat transfer zone feeds the heat transfer medium perpendicular to the flow of the reacted gaseous medium for cooling the reacted gaseous medium.

5. The system of claim 1, wherein each separator zone among the plurality of separator zones, comprises a desorber zone.

6. The system of claim 5, wherein the corresponding injector device injects the sorbent perpendicular to the flow of the gaseous medium in the corresponding desorber zone, for desorbing a portion of a component from the sorbent so as to generate the reacted gaseous medium and the reacted sorbent.

7. The system of claim 6, wherein each heat transfer zone feeds the heat transfer medium perpendicular to the flow of the reacted gaseous medium for heating the reacted gaseous medium.

8. The system of claim 1, wherein each heat transfer zone exchanges heat between the reacted gaseous medium and the heat transfer medium by directly contacting the reacted gaseous medium with the heat transfer medium.

9. The system of claim 1, wherein each heat transfer zone exchanges heat between the reacted gaseous medium and the heat transfer medium indirectly.

10. The system of claim 1, wherein each heat transfer zone comprises a non-stick coating for preventing fouling of the heat transfer zone.

11. The system of claim 1, wherein each heat transfer zone comprises a vibrator device for vibrating the heat transfer zone for preventing fouling of the heat transfer zone.

12. The system of claim 1, wherein each of the mutually adjacent separator zone and the heat transfer zone are integrated.

13. The system of claim 1, further comprising an organic rankine cycle coupled to a downstream side of each heat transfer zone, wherein the organic rankine cycle circulates a working fluid comprises the heat transfer medium.

14. The system of claim 1, wherein length of each separator zone is designed based on at least one of a flow rate of the gaseous medium, a composition of the gaseous medium, a flow rate of the sorbent, a composition of the sorbent, size of each droplet of the sorbent injected from the injector device, and a density difference between the sorbent and the gaseous medium in the corresponding separator zone.

15. A method comprising:
    directing a flow of a gaseous medium into a flow duct comprising a plurality of separator zones and a plurality of heat transfer zones, wherein the flow duct is entirely oriented along a horizontal direction with reference to the flow of the gaseous medium, wherein each separator zone among the plurality of separator zones and each heat transfer zone among the plurality of heat transfer zones are disposed alternatively in the flow duct;
    injecting a sorbent into the corresponding separator zone, for reacting the sorbent with the gaseous medium flowing through the corresponding separator zone so as to generate a reacted gaseous medium and a reacted sorbent;
    feeding a heat transfer medium into the corresponding heat transfer zone, for exchanging heat between the heat transfer medium and the reacted gaseous medium fed from the corresponding separator zone; and
    recirculating the reacted sorbent from one separator zone disposed downstream to another separator zone disposed upstream among the plurality of separator zones via a recirculation channel, for reacting the reacted sorbent with the gaseous medium or the reacted gaseous medium flowing through the other separator zone, wherein the recirculation channel protrudes outwardly from the flow duct and extends from the one separator zone disposed downstream to the other separator zone disposed upstream; and
    feeding the reacted sorbent from a corresponding separator zone among the plurality of separator zones into a corresponding collector zone among a plurality of collector zones.

16. The method of claim 15, wherein the injecting comprises injecting the sorbent perpendicular to the flow of the gaseous medium in the corresponding separator zone.

17. The method of claim 15, wherein the feeding comprises feeding the heat transfer medium perpendicular to the flow of the reacted gaseous medium in the corresponding heat transfer zone.

18. The method of claim 17, wherein the exchanging further comprises contacting the heat transfer medium directly or indirectly with the reacted gaseous medium.

19. The method of claim 15, wherein the reacting comprises absorbing a portion of a component from the gaseous medium via the sorbent.

20. The method of claim 19, wherein the exchanging comprises cooling the reacted gaseous medium.

21. The method of claim 15, wherein the reacting comprises desorbing a portion of a component from the sorbent via the gaseous medium.

22. The method of claim 21, wherein the exchanging comprises heating the reacted gaseous medium.

* * * * *